United States Patent Office 3,565,878
Patented Feb. 23, 1971

3,565,878
PROCESS TO PREPARE A NOVEL HEAT STABILIZED HALOGEN CONTAINING POLYMER
Joseph Paul Kennedy, Cranford, N.J., assignor to Esso Research and Engineering Company, a corporation of Delaware
No Drawing. Continuation-in-part of application Ser. No. 700,324, Jan. 8, 1968, which is a continuation-in-part of application Ser. No. 568,001, July 26, 1966, which in turn is a continuation-in-part of application Ser. No. 364,295, May 1, 1964. This application Apr. 3, 1968, Ser. No. 718,320
Int. Cl. C08f *3/20, 27/00*
U.S. Cl. 260—92.8                             10 Claims

ABSTRACT OF THE DISCLOSURE

Aluminum trialkyl and aluminum dialkyl monohalide catalyst can be used to graft nonpolymerizable olefins capable of forming carbonium ions, such as 2,4,4-trimethyl-1-pentene to polymers containing highly reactive halogen.

CROSS REFERENCES TO RELATED APPLICATIONS

This application is a continuation-in-part of Ser. No. 700,324, filed Jan. 8, 1968, which in turn is a continuation-in-part of Ser. No. 568,001, filed July 26, 1966, now abandoned, which in turn is a continuation-in-part of copending commonly assigned application Ser. No. 364,295, filed May 1, 1964, now abandoned.

BACKGROUND OF THE INVENTION

Polymers containing halogen functionality are commonly used for industrial purposes. Examples include polyvinylchloride, polyvinylidene chloride, chlorobutyl rubber, polychloroprene, and the like. These polymers contain at least some labile halogen atoms which cause a tendency to thermal instability. Thus, at high temperatures the polymers will lose their halogen atoms and concomitantly tend to become unzipped or degraded. In particular, these materials are vulnerable to degradation while they are being processed since very high temperatures are normally used in processing such materials.

This disadvantage is commonly compensated for by the addition of various stabilizers to the polymer. Commonly used stabilizers generally contain tin. But barium, cadmium, calcium, zinc and lead-containing compounds have also been used. Clearly, there is a financial disadvantage, as well as a processing disadvantage, when one must add extraneous materials to a particular polymer in order to stabilize it against heat degradation.

SUMMARY OF THE INVENTION

This invention relates to a process for alkylating a halogenaed polymer backbone with a single nonpolymerizable olefin and the stabilized products produced thereby, which can include the complete reaction mixture, or selected portions thereof. Even more particularly, the invention relates to the alkylation of polyvinylchloride backbones with nonpolymerizable olefins. This results in substitution of the labile halogens on the backbone with an alkyl substituent, thereby creating a modified polymer which is vastly more heat stable and light stable than the original backbone polymer.

By this technique, polymers of extraordinary heat and light stability but otherwise similar in characteristics to the backbone polymer can be conveniently and easily formed in a chemical reaction, thus eliminating completely the need for compounding the polymer with additional additive materials designed to achieve stability, although optionally such additives can be included for synergistic effects.

It is to be emphasized that the gist of the invention is to provide a single monomer, i.e. a single alkyl substituent, to the backbone of a polymer at the site of a labile halogen. The alkyl substituent can be an ordinary nonpolymerizable olefin, or alternatively can be the product of a previous polymerization.

In brief, the preferred process of the invention involves dissolving a halogenated polymer in an inert solvent, incorporating at least stoichiometric quantities of an Al(M)$_2$R compound and introducing at least stoichiometric quantities of monomer at a temperature of from about $-90°$ to $+70°$ C., preferably $-50°$ to $+50°$ C., and most preferably $-30°$ to $+40°$ C., with agitation for a period sufficient to complete the reaction. In this context, stoichiometric is with relation to the number of labile halogens on the backbone. However, it will be understood that there will be situations where it is not desired to replace all the labile halogens and the proportions must be varied.

While the reaction of a nonpolymerizable monomer to the halogenated compound is a preferred approach, there are two alternatives which also produce satisfactory results.

One of these is simply treating the material with 1,2-dichloroethane alone, without any catalyst or polymerizable olefin. See later herein for a further description of the advantages of using 1,2-dichloroethane alone.

The other is the treatment of the halogenated material, particularly PVC, with the catalyst component alone for a relatively short reaction time of from 1 to 16, preferably 3 to 12, and most preferably 4 to 11, minutes at a temperature of $-90°$ to $-10°$, preferably $-75°$ to $-20°$, and most preferably $-50°$ to $-20°$ C.

The contacting of the starting materials with each other can be done in any order. However, it is least preferred to premix the halogenated polymer with the Al(M)$_2$R compound. The halogenated polymer and the Al(M)$_2$R compound when used together act as the active catalyst system.

DESCRIPTION OF THE PREFERRED EMBODIMENT

The polymers suitable for use as backbone polymers include any halogenated, i.e. chlorinated, brominated, iodinated, or fluorinated, polymer in which the halogen atoms are on an allylic, tertiary or benzylic carbon atoms. By allylic, it is meant

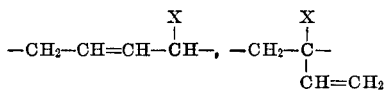

and the like; by tertiary, it is meant

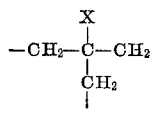

and the like; by benzylic, it is meant

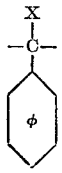

and the like, all when X halogen.

Chloride-containing polymers are preferred. The polymers can be prepared from halogenated monomers or the halogen functionality can be introduced with any suitable post-polymerization technique. Thus, most hydrocarbon high polymers can be used as the backbone polymer for the synthesis after a suitable post-polymerization treatment. The invention also includes the concept of using halogenated low molecular weight materials such as chlorinated liquid paraffins, chlorinated waxes and the like. These liquid materials can be regarded as being halogenated oligomers. They should have at least 6 repeating units. If the functionality of the backbone polymer or oligomer is at the end of the chain, it is possible to obtain block copolymers of the A-B type.

Suitable specific examples of polymers which can be used in the backbone are polyvinylchloride (particularly preferred), polyvinylidene chloride, polyvinylbromide, polyvinylfluoride, polytetrafluoroethylene (Teflon), polychloroprene, as well as polymers which have been modified by post-polymerization treatment to introduce functionality, for example, cholorbutyl, chlorinated polyethylene, chlorinated polypropylene, chlorinated ethylene-propylene copolymer, chlorinated or hydrochlorinated natural rubber, chlorinated or hydro-chlorinated poly-cis-isoprene, chlorinated or hydro-chlorinated poly-cis-butadiene, chlorinated or hydro-chlorinated polystyrene, chlorinated or hydro-chlorinated polypiperylene, hydrochlorinated butyl rubber, etc.

However, it must be noted that it is important that the polymer backbone or starting oligomer material must not contain groups which would interfere with the catalyst or deactivate it. Groups which would tend to have this effect are —CO, —COOR, —NH—, —SH, and —NO$_2$. Thus, polymers such as polyacrylonitrile, polyacrylates, polyesters, nylons, polysulfides, and the like are unsuitable for the purposes of this invention.

It will be noted that some of the halogenated polymers specifically set forth above are not normally thought to contain allylic, tertiary or benzylic functionality, i.e. polyvinyl chloride. However, only a very small amount of such functionality is necessary, i.e. about 0.01 to 5 mole percent, preferably 0.1 to 3 mole percent, and most preferably 0.5 to 3 mole percent, is necessary. For some reason, such polymers contain adequate amounts of the requisite functionality to be suitable for the purposes of this invention.

Nonpolymerizable monomers are certain monomers which, although attackable by carbonium ions, cannot propagate because of severe steric hinderance. For example:

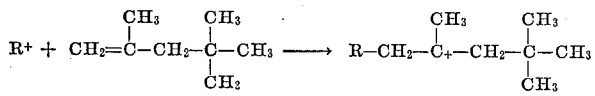

(sterically hindered carbonium ion). In a specific case, R+=PVC+, i.e. a long polymer chain, so that the newly-formed carbonium ion is very severely hindered ("buried").

Suitable nonpolymerizable olefins which can be used in the process of the invention include olefins of the general formula

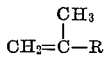

where R is a $C_1$ to $C_{12}$, preferably $C_2$ to $C_8$, and most preferably $C_4$ to $C_6$, straight or branched chain alkyl radical.

Specific monomers which can be used include 2,4,4-trimethyl-1-pentene, 2,4,4,5,5-pentamethyl-1-heptene, 2,3,3-trimethyl-1-butene, 2,4,6-trimethyl-1-heptene, exomethylene cyclohexane, cyclohexene, 2-exomethylene norbornane, α-pinene and derivatives of these.

The catalyst system, which can be used for the purposes of the invention, comprises (1) a catalyst of the type Al(M)$_2$R, where M is a branched or straight chain $C_1$ to $C_{12}$ alkyl radical and R is selected from the group consisting of M, hydrogen and halogen, and (2) a halogen containing polymer with the requisite functionality as described above. For purposes of brevity, the compounds represented by the formula Al(M)$_2$R will be referred to as the "catalyst" though it should be realized that these compounds will, by themselves, not act as a catalyst in the graft alkylations of this invention. The halogenated polymer is also part of the catalyst system and really is a macro coinitiator.

Catalyst components which are not operable in the process of the invention can be represented by the formula: MeZX$_n$, where Me is any metal (including boron). Z can either be X or an alkyl radical. X is halogen and $n$ is a number from 2 to 5. Therefore, compounds of the type MeZX$_n$ should not be present in the reaction in quantities sufficient to exert catalytic effects.

The catalyst components utilized in the present novel catalyst system are those compounds represented by the general formula Al(M)$_2$R, where M is a branched or straight chain alkyl group having from 1 to 12 carbon atoms and R is selected from the group consisting of M, hydrogen and halogen. Suitable catalyst compounds coming within the scope of the above general formula include: diethyl aluminum chloride, dipropyl aluminum chloride, diisopropyl aluminum chloride, dibutyl aluminum chloride, diisobutyl aluminum chloride, dipentyl aluminum chloride, dihexyl aluminum chloride, didecyl aluminum chloride, diethyl aluminum bromide, diisobutyl aluminum bromide, dioctyl aluminum bromide, diodecyl aluminum bromide, diethyl aluminum iodide, dibutyl aluminum iodide, diheptyl aluminum iodide, dinonyl aluminum iodide, ethyl propyl aluminum chloride, propyl butyl aluminum chloride, ethyl propyl aluminum bromide, diethyl aluminum hydride, dibutyl aluminum hydride, dihexyl aluminum hydride, trimethyl aluminum, triethyl aluminum, methyl diethyl aluminum, dimethyl ethyl aluminum, triisobutyl aluminum, trihexyl aluminum, etc. The compounds of the subclass illustrated by the formulas AlR$_3$ and AlR$_2$X where R is a straight chain alkyl group having 1 to 12 carbon atoms and X is halogen, are preferred. Particularly preferred are triethyl aluminum and diethyl aluminum chloride, which will be used here for illustrative purposes.

Diethyl aluminum chloride, which is commercially available, is a clear colorless liquid with a melting point of —74° C. and a boiling point of 208° C. The substance is highly reactive with oxygen and will burst into flames in air and react violently with water. It is miscible with saturated aliphatic and alicyclic hydrocarbons, chlorinated hydrocarbons, carbon disulfide, etc. Diethyl aluminum chloride may be prepared from aluminum triethyl and aluminum chloride according to the following formula:

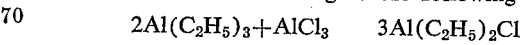

In general, any inert solvent can be used. For the purpose of this invention inert solvents are defined as those which will not deactivate the catalyst. Suitable examples of such solvents are aliphatic hydrocarbons, e.g. pentene, hexane, or chlorinated hydrocarbons, e.g. methyl chloride, ClCH₂CH₂Cl, o-chloro-toluene, carbon disulfide, methylene dichloride, carbon tetrachloride, chlorobenzene, toluene, cyclohexane, methylcyclohexane, etc. 1,2-dichloroethane is a particularly preferred solvent.

The preferred solvent, 1,2-dichloroethane as pointed out above, is useful with PVC by itself. Pure polyvinylchloride resin cannot be molded at 200° F. It has been found that when the resin is swollen or dissolved in 1,2-dichloroethane solvent and then reprecipitated and dried, it can be compression molded to clear pads at 200° F. Thus, when a commercial PVC (Imperial 6603) material was placed in a compression mold at 200° F. (4 min. warm up, 10 min. pressing with 8 tons), it did not mold at all (i.e. it remained a powdery material).

But another sample of the same PVC was dissolved in 1,2-dichloroethane, reprecipitated in methanol, dried at 50° C. and molded under identical conditions molded to a clear pad. Both samples contained 4 parts of Thermolite stabilizer. Thus, use of 1,2-dichloroethane accomplishes the dual purpose of permitting the molding of PVC at relatively low temperatures with concomitant improvement of stability. But the improvement in stability is not as pronounced as when the monomer alkylation process is used.

Moreover, in certain situations, the process of the invention can be carried out with no solvents. In these instances, the unreacted monomers would act as the solvent. For instance, certain low molecular weight polyvinylchlorides can be dissolved in liquid nonpolymerizable monomers. Upon addition of the catalyst, the grafting reaction will be initiated and will be limited only by the disappearance of the monomer, i.e. liquid phase.

In the parent applications referred to above, it was emphasized that great control could be exercised over the type of branches which are synthesized to the backbone polymer. Those grafted branches could be long, high molecular weight chains or low molecular weight oligomers having only a few units. Moreover, it is possible to form graft polymers where the branches were copolymers. As examples, there was cited the grafting of a copolymer of isobutylene and a diene onto polyvinylchloride or clorinated ethylene-propylene rubber.

Furthermore, it was disclosed that isobutylene could be grafted onto polyvinylchloride polymers to produce products which could form clear, pliable films and pads on compression molding. Thus, by utilizing the technique of the invention in the above referred two applications, polyvinylchloride, normally a brittle material, could be superplasticized by the grafted branches so that the addition of extraneous plasticizers where were normally absolutely essential could be dispensed with or the required quantity could be greatly reduced. The materials which have been plasticized by grafting according to the process of that invention were referred to as "internally plasticized polymers."

While the isobutylene graft polymers onto polyvinylchloride backbones described in the prior applications mentioned above, produced stable alkyl chains, the side graphs essentially change the basic nature of the PVC material to something that is much closer to a rubber. Furthermore, the isobutylene must be used in fairly large quantities to ensure that all reactive sites are satisfied. Since the tendency to polymerize and the tendency to substitute on the backbone carbonium ion sites are about equal, long chains must inevitably be formed.

Nevertheless, this invention has focused upon the important discovery that in order to improve the heat and light stability of halogenated polymers, particularly polyvinylchloride, it is not necessary to graft a long organic chain, but a single molecule can be substituted upon the backbone.

Thus, a labile halogen can be extracted from a halogenated backbone with any of the catalysts described, such as AlEt₂Cl or AlEt₃ catalyst, and then the incipient carbonium ion is now captured with the nonpolymerizable olefin. In this connection, the nonpolymerizable olefin can be thought of as a carbonium ion trap.

It can be theorized that the reactions occur as follows:

(1) The alumino organic catalyst removes the labile chlorines from polyvinylchloride

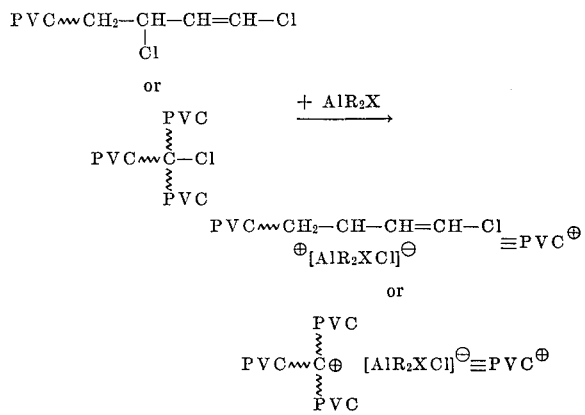

where PVC indicates a long PVC molecule; R and X are alkyl, aryl, hydrogen and halogen groups respectively.

(2) The transitory carbonium ion attacks the nonpolymerizable olefin (the symbol PVC⁺ stands for the carbonium ions formed in the first reaction; the gegen ion is omitted for the sake of clarity):

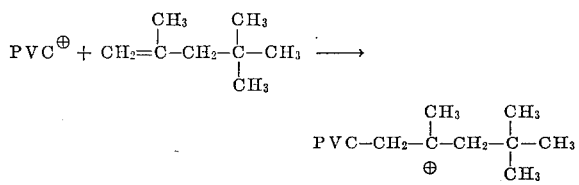

The newly formed alkyl carbonium ion is "buried," it cannot attack another olefin and will decay by secondary reactions, probably by proton loss, etc.

The final product is an alkylated PVC containing no labile chlorines, and in which the number of carbon atoms in each alkyl substituent is no greater than the number in the nonpolymerizable monomer.

The invention is further illustrated by the following examples.

EXAMPLE 1

Treating PVC with 2,4,4-trimethyl-1-pentene and AlEt₂Cl

First 50 g. of a polyvinyl chloride polymer having an intrinsic viscosity of about 0.95 obtained from the B. F. Goodrich Company as Geon 103 was dissolved in 2000 ml. of 1,2-dichloroethane by stirring for 48 hrs. at 37° C. To the resulting solution was added 12.4 ml. of 2,4,4-trimethyl-1-pentene and subsequently 5 ml. AlEt₂Cl dissolved in 5 ml. 1,2-dichloroethane under stirring in a dry box filled with N₂ at room temperature, (it was assumed that ~5% of the chlorine in PVC was in a labile form; stoichiometric amounts of trimethylpentene and catalyst were used with reference to this labile chlorine fraction).

The solution turned pale yellow. After 5, 10 and 30 minutes of stirring 200 ml. aliquots were removed, precipitated into methanol to destroy the catalyst and to remove unreacted trimethylpentene, filtered and dried at 50° in vacuo for 48 hrs. After 60 minutes of stirring methanol was introduced into the reactor to terminate the experiment; this final product was also worked up as the aliquot samples. All the samples were white powders after filtering from methanol and drying.

They were placed in stainless steel molds and compression molded under the following conditions: 4 mins. warm up, 5 mins. press at 325° F. (163° C.) with 9 tons ram pressure, cooling under pressure between cooled platens.

Into the mold, side by side with the treated samples, there were also placed control samples. These control samples were untreated, virgin Geon 103 samples "from the bottle." The simultaneous testing of control samples is absolutely necessary to obtain reliable heat stability differences. Table 1, which follows, summarizes the colors of the various samples.

TABLE I

[Differences in discoloration between treated (2,4,4-trimethyl-1-pentene/AlEt₂Cl) and untreated (control) PVC samples]

| | Treatment time, mins. | | | |
|---|---|---|---|---|
| | 5 | 10 | 30 | 60 |
| Color of treated samples | Off white, green tinge. | Off white, green tinge. | Off white, green tinge. | Off white grayish green. |
| ISCC-NBS designation ¹ | 90.gy Y | 93.y gray | 90.gy Y | 90.gy Y. |
| Color of controls | Brown | Brown | Brown | Brown. |
| ISCC-NBS designation ¹ | 55. s Br | 54. br O | 54. br O | 55. s Br. |

¹ Inter-Society Color Council–National Bureau of Standards (ISCC-NBS) method.

EXAMPLE 2

Treating Imperial-PVC with 2,4,4-trimethyl-1-pentene and AlEt₂Cl

The experimental procedures, etc., were essentially the same as in Example 1 with Geon 103, except that a market development sample of PVC designated as Imperial PVC (MD 6603, Lot #4461) having an intrinsic viscosity of 1.15 was used as the starting material. Essentially, the same visual observations were made as in Example 1. The colors of the molded pads also showed remarkable differences between treated and control specimens. The 2,4,4-trimethyl-1-pentene treated samples were only light green, whereas the untreated control samples showed a brown color. The differences were similar to those shown in Table I.

EXAMPLE 3

Control experimental without the addition of 2,4,4-trimethyl-1-pentene at room temperature In this control experiment no 2,4,4-trimethyl-1-pentene but only AlEt₂Cl was used. The PVC solution in 1,2-dichloroethane turned immediately yellow on catalyst addition (5.0 ml. AlEt₂Cl in 5 ml. dichloroethane) and the color kept on deepening with time. One minute after catalyst addition the color of the solution was reddish-black. After 4 minutes the content of the reactor suddenly jelled. Stirring became almost impossible after 6 minutes. The run had to be discontinued 10 minutes after catalyst addition. Methanol was added into the reactor and a yellow powder was obtained which was filtered and dried. This yellow powder was insoluble (swelled) in hot tetrahydrofuran, a good solvent for PVC, indicating extensive gelation. The final dry product was compression molded under the conditions specified above. Compression molded pads were badly discolored (reddish-black) and completely unacceptable.

EXAMPLE 4

Adding the AlEt₂Cl at −30° C.

Example 3 was repeated at −30°C. The content of the reactor turned light yellow after the introduction of AlEt₂Cl. After 30 minutes of stirring at −27° C., the color deepened to yellow. The product was worked up as described in Example 3. The compression molded samples obtained after 5 and 10 minutes of stirring exhibited improved heat stability while the 30 and 60 minutes samples turned black indicating severe heat damage. The results are summarized in Table II which shows the comparative color of the samples examined.

TABLE II

[Discoloration of PVC treated with AlEt₂Cl in 1,2-dichloroethane solution for various times]

| | Time of treatment with AlEt₂Cl, mins. | | | |
|---|---|---|---|---|
| | 5 | 10 | 30 | 60 |
| Color of AlEt₂Cl treated samples. | Light green. | Light green. | Black | Black. |
| Color of Geon-103 control. | Brown | Brown | Brown | Brown. |

It should be noted from the above examples that the catalyst component alone imparts satisfactory stability under relatively short reaction conditions and low temperatures. However, stabilization using the AlEt₂Cl/2,4,4-trimethyl-1-pentene system gives a quantitatively better product, i.e., a PVC with lighter color (cf. Tables I and II). Another advantage of suing 2,4,4-trimethyl-1-pentene is that the process with this agent can be carried out at ambient temperature without cooling.

EXAMPLE 5

Control experiment without the addition of 2,4,4-trimethyl-1-pentene and AlEt₂Cl catalyst In four flasks, four 5-gram samples of Geon 103 were placed into 125 ml. of 1,2-dichloroethane and the slurries were stirred with a magnetic stirrer at room temperature. The four slurries were stirred for 15, 60, 240 mins. and overnight, respectively. Then the partially dissolved and swollen slurries were precipitated into methanol, filtered and dried in vacuo at 50° C. for 48 hrs.

The white powders were then compression molded under the conditions described in Example 1. The color differences between the swollen- and precipitated samples and "from the bottle" control samples were noticeable (Table III) but not as dramatic as those between the 2,4,4-trimethyl-1-pentane/AlEt₂Cl treated and untreated control samples shown in Table I. The results of this experiment are summarized below the Table III.

It should be emphasized that in these experiments the swollen slurries were precipitated into methanol; consequently, and partially dissolved material was recovered.

In another set of experiments the slurries were not precipitated into methanol but they were filtered after stirring for 1, 5, 15 and 30 mins. in 1,2-dichloroethane at room temperature. After drying the samples were compression molded. In this case the beneficial effect of 1,2-dichloroethane was noticeable but only marginal.

TABLE III

Difference in discoloration between swollen-and-precipitated and "from the bottle" control PVC samples]

| | Slurried in 1,2-dischloroethane (swollen), hrs. | | | |
|---|---|---|---|---|
| | 0.25 | 1 | 4 | 17 |
| Color | Light tan. | Light tan. | Light tan. | Light tan. |
| Color of control | Brown | Brown | Brown | Brown. |

Although the above has been described with some degree of particularly, it should be understood that variations and modifications can be made therein without departing from the spirit of the invention as hereinafter claimed.

What is claimed is:

1. A process for stabilizing a halogen-containing polymer which comprises reacting at least stoichiometric quantities based on reactive halogen of nonpolymerizable olefin having the general formula

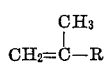

where R is a $C_1$ to $C_{12}$ straight or branched chain alkyl radical with said polymer having at least 6 repeating monomeric units, wherein said halogen is selected from the reactive halogen group consisting of allylic halogen, tertiary halogen, benzylic halogen, and combinations of the foregoing in the polymer molecule, in the presence of $AlM_2R$ catalyst where M is a $C_1$ to $C_{12}$ alkyl radical and R is selected from the group consisting of M, hydrogen and halogen wherein said polymer becomes the backbone of said graft polymer.

2. A process according to claim 1 wherein said catalyst is diethyl aluminum chloride.

3. A process according to claim 1 wherein said catalyst is triethyl aluminum.

4. A process according ot claim 1 wherein said halogen-containing macromolecule is polyvinyl chloride.

5. A process according to claim 1 wherein said macromolecule is chlorinated butyl rubber.

6. A process according to claim 1 wherein said nonpolymerizable monomer is 2,4,4-trimethyl-1-pentene.

7. A process for stabilizing a halogen-containing polymer which comprises contacting said polymer with an $AlM_2R$ catalyst where M is a $C_1$ to $C_{12}$ alkyl radical and R is selected from the group consisting of M, halogen and halogen, wherein said contacting is carried out at a temperature of minus 50° C. to 0° C. for a time of from 1 to 16 minutes.

8. The product prepared by the process of claim 1.

9. A composition according to claim 8 wherein said halogenated polymer is polyvinylchloride.

10. A polymer according to claim 8 wherein said nonpolymerizable olefin is 2,4,4-trimethyl-1-pentene.

References Cited

Chemical Abstracts, vol. 60, p. 15991b, 1964, Minsher et al.

Chemical Abstracts, vol. 48, p. 1727b, 1954, Akhmedov et al.

Chemcial Abstracts, vol. 47, p. 3028i, 1953, Geller et al.

Chemical Abstracts, vol. 57, p. 18689i, 1957, Teyssié et al.

JOSEPH L. SCHOFER, Primary Examiner

J. A. DONAHUE, JR., Assistant Examiner

U.S. Cl. X.R.

260—91.7, 92.1, 92.3, 93.1, 93.5, 94.7, 94.9